J. C. CONWAY.
AUTOMATIC STACKER AND UNLOADING BARGE.
APPLICATION FILED OCT. 12, 1917.
1,270,120.
Patented June 18, 1918.
3 SHEETS—SHEET 3.
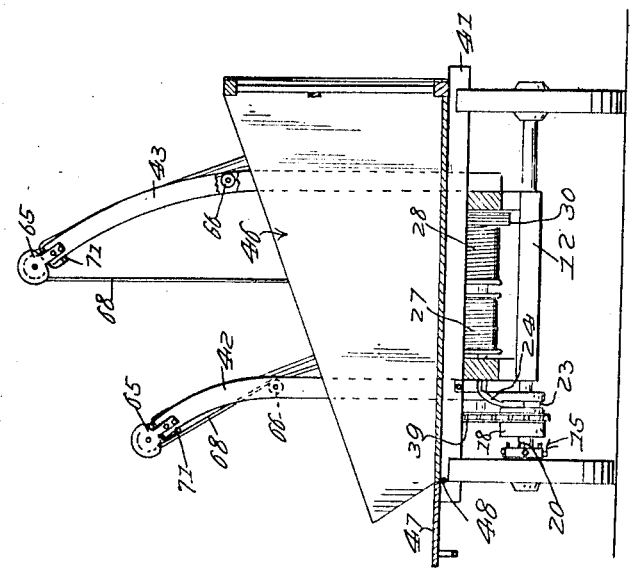
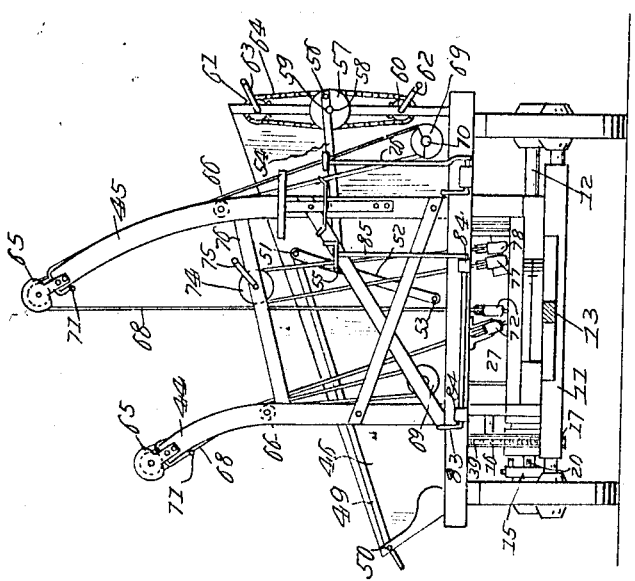
Inventor
Julian C Conway
By Frank S. Appleman
Attorney

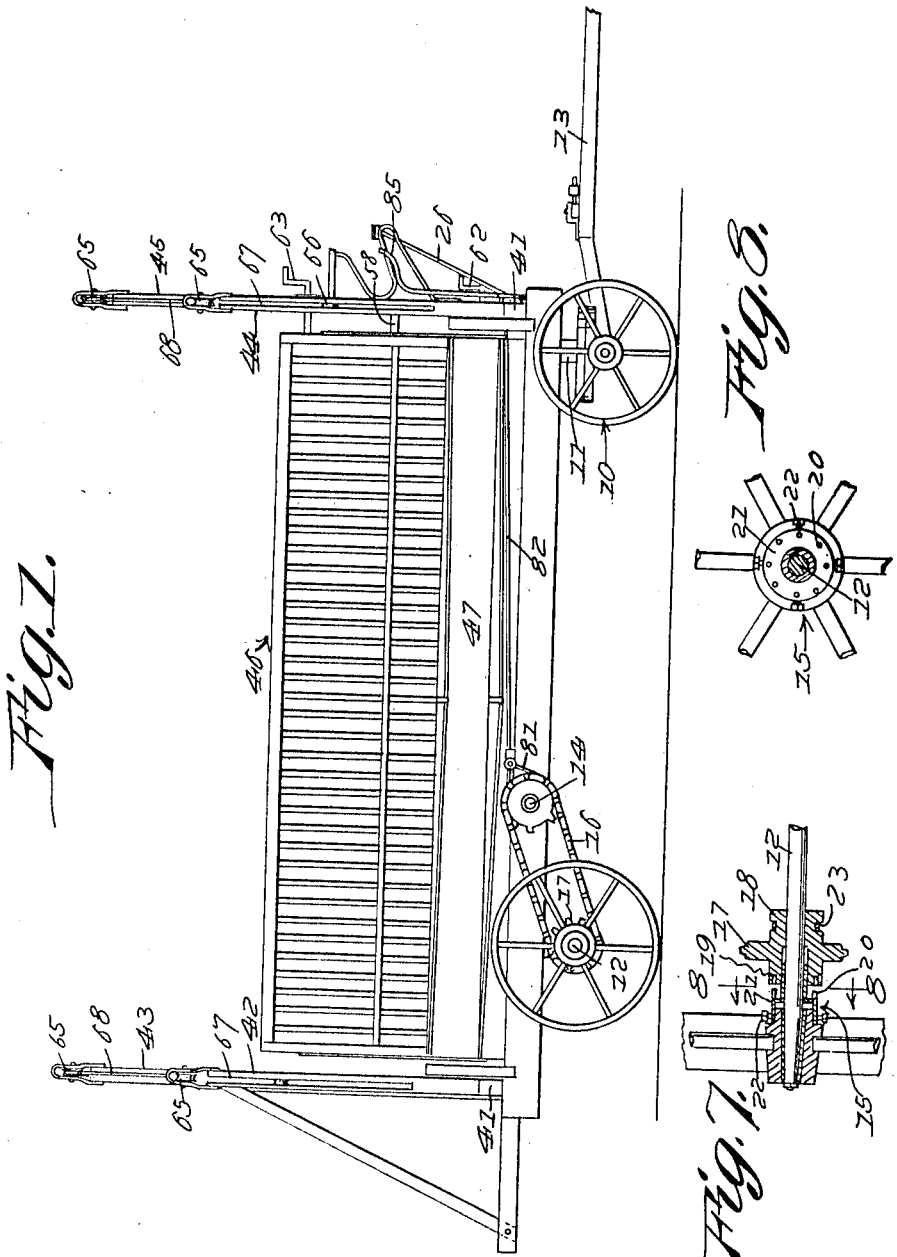

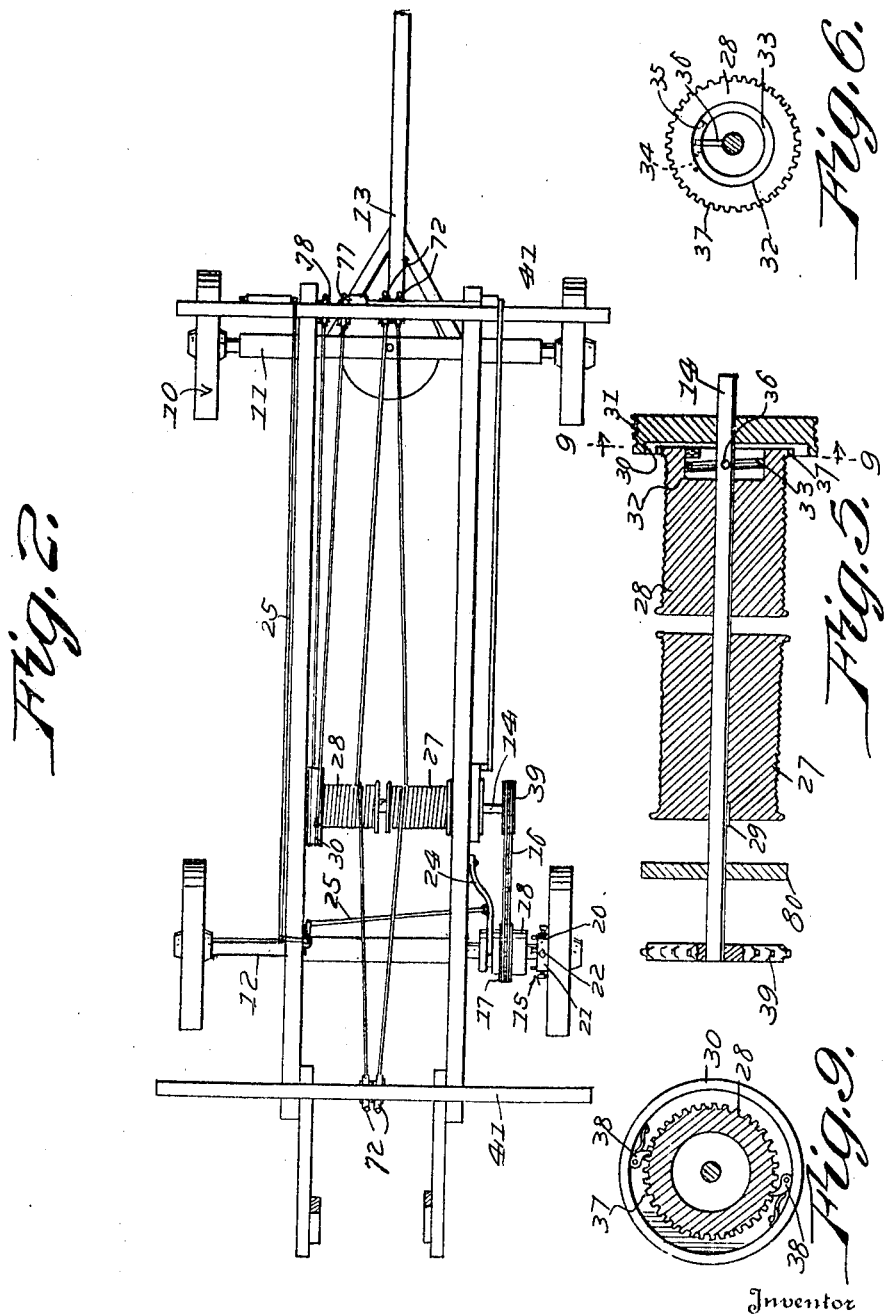

UNITED STATES PATENT OFFICE.

JULIAN C. CONWAY, OF ROGERSTOWN, TEXAS.

AUTOMATIC STACKER AND UNLOADING BARGE.

1,270,120.  Specification of Letters Patent.  Patented June 18, 1918.

Application filed October 12, 1917. Serial No. 196,235.

*To all whom it may concern:*

Be it known that I, JULIAN C. CONWAY, a citizen of the United States of America, and resident of Rogerstown, in the county of Ochiltree and State of Texas, have invented certain new and useful Improvements in Automatic Stacker and Unloading Barges, of which the following is a specification.

This invention relates to the art of loading and unloading and more particularly to a device designed for stacking vegetation such as wheat, hay or other commodity which may be gathered and conveyed to a central point or place of deposit, the said invention having for its object the provision of novel means for receiving material to be conveyed, said invention also comprising novel means whereby a predetermined amount of the load may be released upon tilting of the carrier or whereby the whole load may be discharged when the carrier is tilted.

A further object of this invention is to provide a novel carrier with means for its elevation from the truck or wagon on which it is being conveyed, novel means being also provided for communicating the motion of the truck or wagon to the elevating means so that power derived from the movement of the truck or wagon may be utilized for elevating the load, a still further object of the invention being the provision of novel means for tilting the carrier and discharging the load.

A further object of this invention is to provide novel means for coupling the elevating means to the running gear of the truck or wagon whereby winding mechanism for elevating the load may be actuated.

A still further object of this invention is to provide controlling mechanism whereby the power transmitting means may be regulated from a driver's or operator's seat, so that all the parts may be manipulated for carrying into effect the objects stated.

With the foregoing and other objects in view, the invention consists in the details of construction, and in the arrangement and combination of parts to be hereinafter more fully set forth and claimed.

In describing the invention in detail, reference will be had to the accompanying drawings forming part of this specification wherein like characters denote corresponding parts in the several views, and in which—

Figure 1 illustrates a view in side elevation of a conveyer and loader embodying the invention;

Fig. 2 illustrates a plan view of the truck or wagon with the carrier omitted;

Fig. 3 illustrates a front end view of the device embodying the invention;

Fig. 4 is a vertical sectional view of Fig. 1 at approximately the center;

Fig. 5 illustrates a sectional view of a coupling winding mechanism;

Fig. 6 is an end view of one of the winding drums having the shaft in section;

Fig. 7 illustrates a sectional view of the power transmitting coupling between the traction wheel and the power transmitting wheel;

Fig. 8 illustrates a sectional view on the line 8—8 of Fig. 7; and

Fig. 9 illustrates a sectional view on the line 9—9 of Fig. 5.

In these drawings 10 denotes a truck which may comprise an ordinary running gear of a farm wagon or other wheel supported conveyance, the same having a front axle 11 and a rear axle 12 and any convenient draft applying attachment such as a tongue 13.

Intermediate the length of the frame of the truck, there is a transversely disposed shaft 14 appropriately journaled so that it can be driven from the axle 12 through the medium of clutches 15 and connections 16 such as sprockets and chains or belts and pulleys but the construction here shown comprises a sprocket wheel 17 associated with a part of the movable clutch member 18 which is mounted on the axle, it being observed that the clutch member 18 has seats or sockets 19 for the reception of projections 20 formed on the clutch member 21 which may be connected to a hub or other part of a wheel 22. Each clutch member has a circumferential groove 23 to receive the bifurcated end of a lever 24 by which the clutch member is moved with relation to the coacting clutch member and these clutch members are under the control of a link 25 leading to the front of the truck where it may be operated by a lever 26 for the purpose of throwing the clutches into and out of coupled relation.

The shaft 14 has winding drums 27 and 28 mounted on it, the drum 27 being secured to the shaft as by a key 29 so that it rotates with the shaft whereas the drum 28 is free to rotate independently of the shaft. A drum or disk 30 has a grooved periphery 31 in which a cable or flexible member is wound and by which it is rotated. The disk 30 co-acts with the drum 28 for communicating rotary motion to the drum under certain conditions of operation, as will presently appear.

The drum 28 has a recessed end 32 and the side wall of the recess has a spiral flange 33 on it, the ends of the spiral overlapping and constituting shoulders 34 and 35 which are contacted by a pin 36 on the shaft 14 so that as the shaft rotates, the pin is carried around the spiral flange and when it contacts with one of the shoulders, motion of the shaft is communicated to the drum.

The periphery of the drum at one end has ratchet teeth 37 which are engaged by dogs 38 carried by the disk 30, the said dogs being spring pressed to hold them into engagement with the ratchet teeth. The pitch of the ratchet teeth is such that the drum may be moved independently of the disk when rotating in one direction whereas the rotation of the disk causes the dogs to engage the ratchet teeth for the purpose of communicating the motion of the disk to the drum as will presently appear. The ends of the shaft 24 have sprocket wheels 39 which are engaged by the sprocket chain 16 for communicating the motion of the traction wheels to the shaft.

The truck has any suitable frame or bolster 41 for supporting a body and the said frame also supports standards 42 and 43 at the rear and standards 44 and 45 at the front which are to be utilized as supports for pulleys and rigging used in elevating the body 46, the said body being unlike an ordinary wagon body in that it is preferably provided with one hinged side 47 which is connected to the body by any appropriate pivots or hinges such as 48. The side 47 has a link 49 pivoted to it as at 50 and the said link has its inner end mounted on a pivot 51 carried by the lever 52, the said lever being oscillatably mounted on a stud 53 anchored on the front end of the body. The lever 52 has a pitman 54 connected to it by the pivot 55 and the said pitman is connected by a wrist pin 56 with a sprocket wheel 57 which sprocket wheel is mounted on a shaft 58. The pitman 54 is recessed at one edge as at 59 and the recess constitutes a clearance for the shaft 58 when the parts are in the position shown in Fig. 3, the position the parts occupy when the side of the body is closed.

Sprocket wheels 60 and 61 are rotatably mounted on the body and they are supplied with crank handles 62 and 63 respectively by which they are turned, and the sprocket wheels 57, 60 and 61 are all connected together by a sprocket chain 64 so that motion of either of the sprocket wheels 60 and 61 may be communicated to the sprocket wheel 57. Usually in practice, the driver occupying the seat may manipulate the upper crank 63 whereas after the body has been elevated, the crank 63 would be at too great an elevation for convenient manipulation and then the lower crank 62 would be operated for the purpose of turning the sprocket wheel 57 and operating the mechanism which controls the hinged side and the mechanism makes it possible to open the side to a greater or lesser degree so that a greater or lesser amount of the load will be discharged when the body has been moved to a predetermined angle with relation to its normal position. The standards are preferably uniformly equipped with sheave pulleys and anti-friction rollers and hence a description of the equipment of one will suffice as a disclosure of all of them and each will therefore not be described specifically, but it is believed sufficient to say that each at its upper end has a sheave pulley 65 and that an anti-friction wheel 66 is supplied intermediate the length of the said standard. Each standard is also preferably provided with a slot 67 in which the anti-friction wheels 66 are mounted and over which the hoisting cable or rope 68 may travel. While I have termed the member 68 as a "cable or rope" it is to be understood that any flexible device may be employed in this connection and I do not, therefore, wish to be limited with respect to the identity of these elements, but for convenience in description, they will hereafter be referred to as cables. There are pulleys 69 mounted on stud shafts 70 at the ends of the body and the cables run over these pulleys and the cables are applied to the sheave pulleys on the standards and the pulleys on the ends of the body and are then run over the winding drums 27 and 28 for elevating the body. Each cable has one of its ends anchored as at the point 71 to a standard and is then looped around one of the pulleys 69 and threaded back over the top of the standard on the sheave pulley which is carried at the end of the standard, then extends downwardly to one of the sheave pulleys 72 and from there longitudinally of the truck to one of the drums and by these constructions and arrangements of parts, an operator may, upon approaching the point where the load is to be deposited, throw the clutch 18 so as to utilize the rotation of the traction wheels for communicating motion to the drums, and as the truck moves the cables are wound on the drums and the body of the loader is elevated a predetermined degree. After the body has been elevated, the hinged side may be moved to a predetermined angle by the rotation of either of the crank shafts by which the side of the body is actuated as heretofore described and the parts are then in position for tilting the body so as to cause the load to gravitate therefrom to the place where it is to be deposited.

As a means for tilting the body, I have provided a cable 73 which operates over a pulley 74 and the pulley is mounted on a crank shaft 75 journaled in the bar 76 which may be connected to the two front standards in any appropriate way so as to be supported. The cable 73 operates over sheave pulleys 77 and 78 and is wound on the periphery of the disk 30 and the said disk being coupled to the drum 28 by the ratchets turns the said drum independently of the other drum on the shaft 14 and causes the cables thereon to be wound so that the body is elevated at one side more than it is on the other, and hence the load carried by the body gravitates to the degree stated. The degree of rotation of the drum 28 is limited by reason of the presence of the pin 36 on the shaft 14 coming in contact with the shoulder 35 of the spiral flange 33. Upon the return of the body to a horizontal position or unwinding of the cable results in rotation of the drum 38 so that it returns to normal position where the pin is in engagement with the shoulder 34 of the spiral flange so that the drum may be again rotated under the power of the movement of the truck.

The shaft on which the drum is mounted has a friction disk 80 secured to it and a brake band 81 embraces the said disk. A rod 82 has the brake band connected to it and the rod is reciprocated by reason of its front end being connected to a crank 83 journaled in brackets 84 at the front of the body of the truck and the said crank is under the control of a foot lever 85 so that the operator may press the foot lever and control the rotation of the drums when the body is descending so as to control the descent or the truck may be operated to hold the body at different elevations while it is being dumped since the freely rotatable disk and freely rotatable drum are not affected when turning in one direction by the action of the brake.

In the description relating to the parts of the apparatus, I have described the function of each part and its relation to other parts so that it is believed unnecessary to give a résumé of the operation of the several parts, but generally speaking, it will be understood that after the device has been loaded for transferring material from one location to another as in a field where grain or hay is to be taken from windrows or the like to the location of a stack, the device is drawn on the truck by draft animals and when the location where the load is to be deposited is approached and just prior to reaching the location, the foot lever is operated to throw the clutch which is operated by the traction wheel. The motion of the traction wheel is therefore communicated to the clutch member which has been thrown into operative relation to the clutch member on the traction wheel and the drums are rotated. The fact that the cables are each anchored to one of the standards and operate over the sheave pulleys and over a pulley on the body and then extend around the drums, will result in winding the cables on the drums and lifting the body in the manner stated. When the body has been elevated to a predetermined extent, the clutch may be thrown out thus arresting the movement of the drums and the winding of the cables. The hinged side is operated through the manipulation of one of the crank handles whereby the links and levers connecting the hinged side to the sprocket wheel which is rotated by the movement of one of the said crank handles until the said hinged side stands at a predetermined angle with relation to the body, and that will determine the percentage of the load which is to be deposited. The body is then tilted by the hand operated crank which moves the cable wound on the disk and the disk in turn communicates motion to the drum on one side of the truck, thus causing the winding of the cable on one side to a greater degree than that on the other side, thereby raising one side still farther and causing tilting of the body which causes the gravitation of the load and its removal or the removal of part of it and afterward the parts are operated in a reverse direction for restoring the parts to normal position and returning the body to the sills or frame of the truck.

I claim—

1. In a loading and unloading device, a body, a truck having traction wheels, standards thereon, a shaft journaled on the truck, means for communicating the motion of the traction wheels to the said shaft, drums on the said shaft, one of which is freely rotatable thereon, means for coupling one of the drums to the shaft, means for communicating the motion of the shaft to the other drum, a disk rotatable on the shaft, means for communicating the motion of the disk to the shaft when moving in one direction and for permitting independent movement of the drum with relation to the disk when turning in one direction, means for rotating the disk, cables wound on the drum operating over the standards, and means for connecting the cables to the body of the device whereby the motion of the cables is communicated to the said body.

2. In a loading and unloading device, a body, a truck having traction wheels, standards thereon, a shaft journaled on the truck, means for communicating the motion of the traction wheels to the said shaft, drums on the said shaft, one of which is freely rotatable thereon, means for coupling one of the drums to the shaft, means for communicating the motion of the shaft to the other drum, a disk rotatable on the shaft, means for communicating the motion of the disk to the shaft when moving in one direction and for permitting independent movement of the drum with relation to the disk when turning in one direction, means for rotating the disk, cables wound on the drum operating over the standards, means for connecting the cables to the body of the device whereby the motion of the cables is communicated to the said body, a side hinged to the body, and means for holding the side in different positions of adjustment with relation to the body.

3. In a loading and unloading device, a body, a truck having traction wheels, standards thereon, a shaft journaled on the truck, means for communicating the motion of the traction wheels to the said shaft, drums on the said shaft, one of which is freely rotatable thereon, means for coupling one of the drums to the shaft, means for communicating the motion of the shaft to the other drum, a disk rotatable on the shaft, means for communicating the motion of the disk to the shaft when moving in one direction and for permitting independent movement of the drum with relation to the disk when turning in one direction, means for rotating the disk, cables wound on the drum operating over the standards, means for connecting the cables to the body of the device whereby the motion of the cables is communicated to the said body, a side hinged to the body, links and levers for communicating motion to the said side, a pitman for operating one of the levers, a disk, a wrist pin for connecting the pitman to the disk, and means for rotating the disk.

4. In a loading and unloading device, a truck including traction wheels and a body, standards carried by the truck, rotatable members on the standards, cables operating over the rotatable members, rotatable members carried by the body in engagement with which the said cables operate to support the body, means for winding the cables, means for connecting the traction wheels and the cable winding means for communicating motion to the cable winding means, and a body tilting means for elevating one side of the body independently of the other.

5. In a loading and unloading device, a truck including traction wheels and a body thereon, a shaft journaled on the truck, a drum rigidly connected to the shaft, a drum free to rotate on the shaft, said drum having a flange on its surface terminating in shoulders, a member on the shaft adapted to contact the shoulders, means for operating the freely movable drum independently of the shaft, cables wound on the said drums, members on the said standards over which the cables operate, and members on the body engaged by the cables whereby the movement of the cable is communicated to the body.

6. In a loading and unloading device, a truck including traction wheels and a body thereon, a shaft journaled on the truck, a drum rigidly connected to the shaft, a drum free to rotate on the shaft, said drum having a flange on its surface terminating in shoulders, a member on the shaft adapted to contact the shoulders, means for operating the freely movable drum independently of the shaft, cables wound on the said drums, members on the said standards over which the cables operate, members on the body engaged by the cables whereby the movement of the cable is communicated to the body, and means for braking the drum shaft and holding it at different positions of adjustment.

7. In a loading and unloading device, a truck and a body, said truck having traction wheels, a shaft journaled on the truck, means for communicating the motion of the traction wheels to the said shaft, a drum fixed on the shaft to rotate therewith, a drum movable freely on the shaft, means for communicating the motion of the shaft to the last mentioned drum, a disk rotatable on the shaft, means for coupling the disk to the freely movable drum whereby the motion of the disk is communicated to the drum, means for rotating the disk, cables wound on the drums, and means for communicating the motion of the cables to the body for elevating and tilting the said body.

JULIAN C. CONWAY.

Copies of this patent may be obtained for five cents each, by addressing the "Commissioner of Patents, Washington, D. C."